United States Patent

[11] 3,620,411

| [72] | Inventor | John H. Rump |
| | | Rockville, Conn. |
| [21] | Appl. No. | 877,956 |
| [22] | Filed | Nov. 19, 1969 |
| [45] | Patented | Nov. 16, 1971 |
| [73] | Assignee | Monsanto Company |
| | | St. Louis, Mo. |

[54] PLASTIC FOOD CONTAINER
2 Claims, 6 Drawing Figs.

[52] U.S. Cl. .................................................. 220/31 S,
229/2.5, 150/0.5, 229/22, 229/44
[51] Int. Cl. ..................................... B65d 43/16,
B65d 1/26
[50] Field of Search .......................................... 220/31 S,
60 R; 229/2.5, 44, 22; 150/0.5

[56] References Cited
UNITED STATES PATENTS

| 3,245,600 | 4/1966 | Friday | 229/2.5 |
| 3,326,408 | 6/1967 | Ringlen | 220/50 R |
| 3,397,774 | 8/1968 | Tjuden | 220/31 S |
| 3,511,433 | 5/1970 | Andrews | 229/44 R |

FOREIGN PATENTS

| 1,313,246 | 11/1962 | France | 220/31 S |
| 448,880 | 4/1968 | Switzerland | 220/31 S |

*Primary Examiner*—George E. Lowrance
*Attorneys*—James C. Logomasini, Michael J. Murphy and Neal E. Willis ABSTRACT: A one-piece, transparent, thin-walled food container suitable for use in vending machines and thermoformable from a single sheet of thermoplastic. The container includes a shallow dish portion out of which the contents may be eaten, a cover portion and a hinge continuous with the dish and cover portions to facilitate opening and closing thereof. One of these portions includes locking means which are self engaging when one portion is forced against the other. A stabilizing post in the cover portion substantially opposite the hinge prevents crosswise displacement of the cover portion with respect to the dish portion of the container.

PATENTED NOV 16 1971 3,620,411

INVENTOR.
JOHN H. RUMP
BY Michael J. Murphy
ATTORNEY

PLASTIC FOOD CONTAINER

BACKGROUND OF THE INVENTION

This invention relates to containers and more particularly to thermoplastic food containers of the single-use, throwaway variety.

Disposable thermoplastic containers of many different varieties have been introduced in the market place in recent years for holding consumable solid and liquid products. Thus, open-topped cups for beverages dispensable from vending machines have been supplied. Film-overwrapped trays for meat, fruit, produce, etc., are likewise known. Tubs tightly capped with removable lids for holding cottage cheese, margarine, butter, etc., in hermetic confinement also have been well developed in the art.

Thus far, however, the only known food items dispensable from vending machines for consumption as a light lunch, snack, or dessert are relatively sturdy items such as sandwiches, fruit, etc. which are film overwrapped and are of such a consistency such that they will not disintegrate or undesirably adhere to the fingers of the purchaser on removing the protective covering. Accordingly, though a market for such products would appear to exist, food items such as pies, cakes with or without frosting, filled pastries, etc., which are susceptible to disintegration during handling and are therefore ordinarily consumed with an eating utensil, have heretofore not appeared in vending machines because of the lack of a suitable inexpensive yet sturdy, disposable container for holding such items, both prior to dispensing and during consumption by the purchaser.

Now there has been developed a unique container to fulfill this longfelt need.

Accordingly, it is an object of this invention to provide a structurally stable, single-use, self-supporting, one-piece, covered container adapted for use in a vending machine for holding single servings of relatively easily disintegratable food items.

Another object of this invention is to provide a container of the aforementioned variety which may be used as a dish out of which the purchased item may be consumed.

A further object of this invention is to provide an inexpensive container of the aforementioned variety which may be readily formed by conventional thermoforming techniques.

Other objects of this invention will in part be obvious and will in part appear hereinafter.

SUMMARY OF THE INVENTION

These and other objects are accomplished by providing a one-piece, transparent, thin-walled food container made from a single sheet of thermoplastic material capable of being thermoformed, said container comprising a shallow dish portion, a cover portion and a hinge continuous with said dish and cover portions and connecting the dish and cover portions for opening and closing thereof along an uninterrupted hinge line, the hinge being thinner than the portions of the dish and cover portions adjacent thereto to improve flexibility along the hinge line, the dish portion having a base which is integrally joined at its marginal edge with a continuously upwardly and outwardly tapering sidewall, the base and sidewall defining a chamber therein for containing a food product and a substantially planar oriented supporting ledge extending outwardly around the periphery of the dish portion at the upper end of the sidewall, the cover portion comprising a top wall which is integrally joined at its marginal edge to a downwardly and outwardly tapering sidewall defining a hollow body, a flange portion extending outwardly from the lower extremity of and around the periphery of the sidewall of the cover portion, a stabilizing post substantially opposite the hinge in a limited peripheral portion of the sidewall of the cover portion terminating below the flange, one of said flange and supporting ledge portions having a skirt extending outwardly away from the outer end thereof, the skirt having locking means formed therein adapted to snap under the other of said flange and supporting ledge portions when the cover portion is closed on the dish portion to hold the cover portion vertically in place on the dish portion, the periphery of the hollow body of the cover portion being aligned opposite the periphery of the dish portion, the flange of the cover portion resting against the supporting ledge of the dish portion and the portion of the stabilizing post below the flange projecting into the chamber of the dish portion when the cover portion is in closed position on the dish portion, the portion of the stabilizing post within the chamber of the dished portion adapted to abut against an upper section of the sidewall of the dish portion on sliding said cover portion on the dish portion in a planar direction away from the hinge to keep the cover portion in substantial vertical alignment with the dish portion.

BRIEF DESCRIPTION OF THE DRAWINGS

In describing the overall invention, reference will be made to the accompanying drawings in which.

DESCRIPTION OF THE PREFERRED EMBODIMENT

Figure 1:
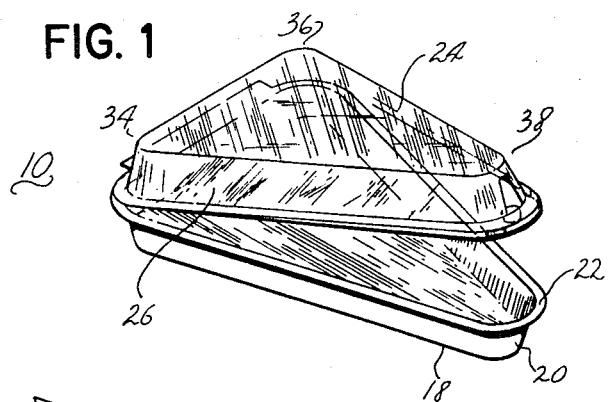
FIG. 1 is a perspective view of one form of the container of the invention in partially open position.
Figure 2:
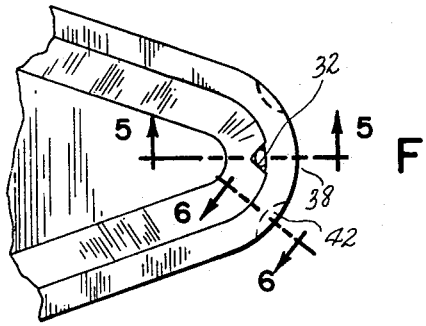
FIG. 2 is a partial plan view of the top portion of the container of FIG. 1.

With reference to the drawings, wherein identical numerals refer to identical parts, there is shown in FIGS. 1 and 2, a one-piece, transparent, thin-walled food container made from a single sheet of thermoplastic material capable of being thermoformed, and which is generally indicated as 10.

In the illustrated embodiment, the overall shape of the container is triangular, since this configuration is particularly adapted to accommodate sliced foods such as pies, cakes and the like. Obviously other shapes such as circular, square, rectangular and other multisided configurations could be used.

Container 10 comprises a shallow dish portion 12, a cover portion 14 and a hinge 15 continuous with dish portion 12 and cover portion 14 connecting the dish and cover portions for opening and closing thereof along an uninterrupted hinge line 16. Hinge 15 is preferably thinner than the sections of the dish and cover portions immediately adjacent thereto in order to improve flexibility along hinge line 16. As can be seen from FIG. 1, with the triangular configuration depicted therein, hinge 15 is located along a side of the container defining the base of the preferred triangular shape.

Dish portion 12 has a base 18 which is integrally joined at its marginal edge with a continuously upwardly and outwardly tapering sidewall 20. Dish portion 12 further comprises a planar-oriented supporting ledge portion 22 extending outwardly around the periphery of dish portion 12 at the upper end of sidewall 20. Base 18 and sidewall 20 define a chamber in dish portion 12 for containing a food product. It should be noted that dish portion 12 is peripherally continuous along the full extent of sidewall 20 and base 18, being free of any interruptions, ledges, crevices, inaccessible corners, etc., which could serve as areas of the package within which the contents could become lodged.

Cover portion 14 comprises top wall 24 which is integrally joined at its marginal edge in a manner similar to that of dish portion 12 to a downwardly and outwardly tapering sidewall 26 defining a hollow body therein. The food product being confined within the container may partially project into the hollow portion of the cover when the container is in closed condition. The sidewalls of both cover and dish portions 12 and 14 taper outwardly to permit stacking a plurality of the containers within each other prior to filling so as to optimize storage space. Hollow body 14 has a flange portion 28 extending outwardly from the lower extremity of and around the periphery of sidewall 26 of cover portion 14. A skirt 27 or dust shield extends downwardly from the outer end 30 of flange 28, so as to surround ledge 22 when the container is in closed position. This dust shield 27 tends to prevent dust particles or the like from entering the container and protects ledge 22 which could come into contact with the contents during consumption by a purchaser. Though this construction is preferable, the skirt alternatively could extend upwardly from the outer end of supporting ledge portion 22.

Figure 3:
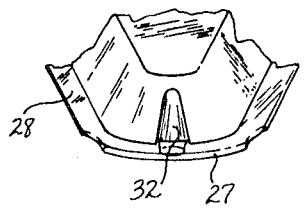
FIG. 3 is a partial perspective view in enlarged form of a portion of the upper section of the container of FIG. 1.
Figure 5:
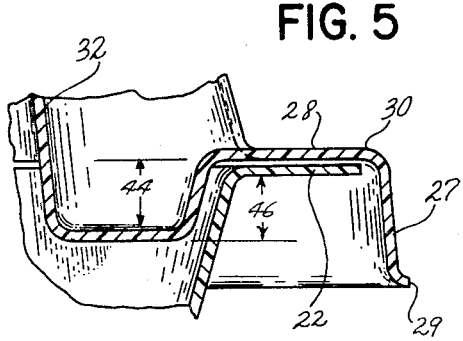
FIG. 5 is an enlarged sectional view taken at 5—5 of FIG. 2 with the container in closed position.

As an important phase of the present invention, there is provided in container 10, a stabilizing post 32 (FIG. 3) positioned in the container substantially opposite hinge 15 in a limited peripheral portion of sidewall 26 of cover portion 14. Post 32 terminates (FIG. 5) slightly below flange portion 28 of the cover portion. In the preferred triangular embodiment of the drawings, the sidewall of the cover and dish portions comprise sections of each which are angularly related to each other so as to form corners 34, 36 and 38 therein. Stabilizing post 32 in such a configuration is positioned in one of the corner areas, preferably in corner 38 at the peak of the triangular shape formed by the container and opposite hinge 15 at the base of the triangular container.

Skirt 27 of cover portion 14 has inwardly extending locking means 40 formed therein adapted to snap under supporting ledge 22 of dish portion 12 when the cover portion is closed on the dish portion so as to hold the cover portion vertically in place with respect to the dish portion. In the embodiment of the drawings, locking means 40 comprises a pair of outwardly opening U-shaped detents 42 in the same corner portion 38 of the container as is situated stabilizing post 32. Detents 42, however, are adjacent to but not in alignment with post 32 in corner 38, since an aligned configuration presents difficulties in the thermoforming operation because of the problem of extricating the section of flange portion 28 intermediate such an aligned post and detent configuration from the forming mold. This difficulty is caused by the reverse taper of post 32 with respect to sidewall 26 and of detents 42 with respect to skirt 27.

Figure 6:
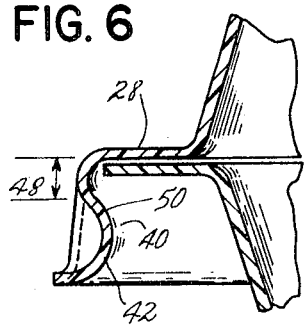
FIG. 6 is a view similar to FIG. 5 taken at 6—6 of FIG. 2.

As is apparent from FIG. 1, when container 10 is in closed position, the periphery of the hollow body of cover portion 14 is aligned opposite the periphery of dish portion 12, flange portion 28 of cover portion 14 rests against supporting ledge portion 22 of dish portion 12 and skirt 27 of dish portion 12 extends downwardly so as to surround the outer end of flange 22 and protect the contents from contamination from the environment. Also, when the container is in closed position, portion 44 at the lower end of stabilizing post 32 below flange 28 projects into the chamber of dish portion 12. Thus, should cover portion 14 be moved in a planar direction away from hinge 15, for example, during jostling while being closed after filling and/or inserted into a vending machine, portion 44 of stabilizing post 32 will abut against upper section 46 of sidewall 20 of dish portion 12. This prevents the thin-walled container from distorting out of shape and maintains cover portion 14 in substantial vertical alignment with lower dish portion 12. Hinge 15 performs a similar stabilizing function if cover portion 14 is moved toward hinge 15. Since the skirt 27 extends downwardly to surround the supporting ledge 22 directly opposite hinge 15, this skirt also performs a stabilizing function by abutting against ledge 22 when the cover portion 14 is moved toward hinge 15. The extent 44 to which stabilizing post 32 projects into the chamber of dish portion 12 when the container is in closed position is greater than the vertical distance 48 (FIG. 6) between flange 28 and the upper end of the particular leg 50 of the U-shaped detent 42 of locking means 40 which is closest to flange 28. Thus, if cover portion 14 should accidentally be incrementally moved upwardly a distance indicated as 48 in FIG. 6 during handling, the lower end 44 of stabilizing post 32 is still below supporting ledge portion 22 of dish portion 12, and can therefore still perform its container stabilizing function. However, lower end 44 of stabilizing post 32 should not project excessively into the chamber of dish portion 12, since this decreases the open volume available for confining the container contents. Preferably the extent to which stabilizing post 32 protrudes into the chamber of dish portion 12 when the container is in closed position in order to accomplish its desired function under all circumstances is between one-sixteenth to one-fourth inch. In any event, lower end 44 should not extend beyond the lowermost extremity 29 of skirt 27 in order to permit forming the container by conventional thermoforming techniques.

Figure 4:
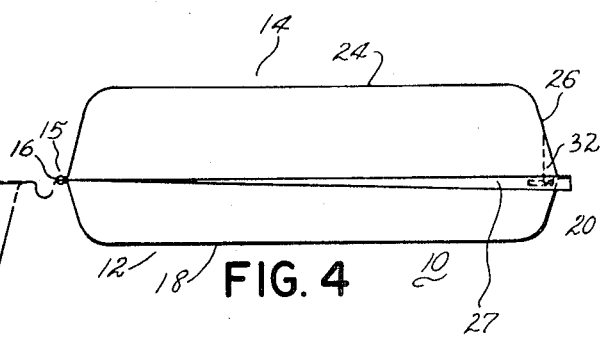
FIG. 4 is an elevational view of the container of FIG. 1 in closed position, with the open position shown in phantom.

In the preferred form of the present invention, the container is designed to be made by means of a trapped-sheet, cut-in-place thermoforming system. Thus, skirt 27 of cover portion 14 is triangular (FIG. 4) in elevation and slopes downwardly away from hinge 15 toward stabilizing post 32. In other words, skirt 27 slopes downwardly away from top wall 24 from the lower end of side wall 26 of cover portion 14 to a low point below locking means 40. It should be understood, however, that skirt 27 need not be of a sloping configuration when formed in a post trim thermoforming system and alternatively could be at a constant elevation around the container periphery.

The above description and particularly the drawings are set forth for purposes of illustration only and are not to be taken in a limited sense.

The dish and cover portions of the novel food container of the present invention are relatively shallow, having a depth of between 0.5 to 3 inches. The depth of the dish portion is preferably less than that of the contents in order to permit easy access thereto with an eating utensil. Each of the dish and cover portions however, must have a recess formed therein in order to provide a structurally stable package and avoid the possibility of a planar oriented portion which is not drawn to any substantial extent in the thermoforming operation in comparison with the other portion of the container, which is drawn and is therefore weaker and thinner in thickness than the undrawn portion. This undesirable thickness variability is avoided by designing the dish and cover portions such that the depth of one is between 50 to 100 percent of that of the other.

The hinge portion of the container of the invention is continuous along a straight portion of the periphery as opposed to being interrupted, the latter configuration requiring an auxiliary cutting step downstream of the forming operation. The hinge preferably has a loop formed therein during thermoforming which decreases the hinge thickness in order to facilitate flexing during opening and closing of the container. As indicated, the unique stabilizing post of the container is positioned in a peripheral portion of the container where the container profile or a line tangent thereto is parallel to the hinge line.

The ledge and flange around the periphery of the dish and cover portions of the container must be sufficiently wide so as to provide adequate support for the cover portion when the container is in closed position, yet cannot be so wide as to interfere with the relatively compact vending machine compartment within which it is to be confined after filling. Generally, a width for these portions of the container of between one thirty-second to three-eighth inch accomplishes these objectives.

The sealing means of the container of the present invention preferably function outside of the recesses formed in the cover and dish portions of the container in order to avoid any contact with the intended relatively fragile contents of the container, and to permit holding the internal container volume at a minimum in order to economically yet effectively contain the contents. In other words, the locking means of the container are associated with the flange and supporting ledge portions which project outwardly of the interior of the cover and dish portions respectively. By designing the locking means to be self-locking, time to assemble and open the filled package may be kept at a minimum, with no auxiliary means, such as adhesives, sealants, etc., being necessary, these often being difficult to remove without disrupting the contents.

The material from which the container is made is a synthetic resin sheet capable of being thermoformed, and particularly a transparent sheet of a material which may be biaxially oriented to impart strength thereto at a relatively low cost per pound. A particularly preferred thermoplastic is biaxially oriented polystyrene. The sheet is relatively thin before drawing, in order to be consistent with the intended single-use, disposable, low-cost, variety of container. Thicknesses between 5 to 40 mils provide satisfactory results in terms of container performance. At sheet thickness below 5 mils, the formed container generally does not have sufficient strength to be self-supporting in a sufficiently sturdy manner in a vending machine dispensing operation. On the other hand, sheet thicknesses in excess of 40 mils are relatively uneconomical and are rather difficult to draw while still retaining the strength imparting biaxial orientation in the thermoplastic.

"Transparent" as used herein is meant to indicate that the nature of the contents can be determined by viewing the exterior of the container. This term therefore characterizes a container which permits partial as well as complete visibility of the contents.

It will be understood that many variations and modifications of the embodiments herein described will be obvious to those skilled in the art, and may be carried out without departing from the spirit and scope of the invention as hereinafter claimed.

What is claimed is:

1. A one-piece, transparent, thin-walled food container made from a single sheet of biaxially oriented polystyrene thermoplastic material capable of being thermoformed, said container comprising a shallow, dish portion, a cover portion and a hinge continuous with said dish and cover portions and connecting said dish and cover portions for opening and closing thereof along an uninterrupted hinge line, said hinge being thinner than the portions of the dish and cover portions adjacent thereto to improve flexibility along the hinge line, said dish portion having a base which is integrally joined at its marginal edge with a continuously upwardly and outwardly tapering sidewall, said base and sidewall defining a chamber therein for containing a food product, and a substantially planar-oriented supporting ledge portion extending outwardly around the periphery of the dish portion at the upper end of the sidewall, said cover portion comprising a top wall which is integrally joined at its marginal edge to a downwardly and outwardly tapering sidewall defining a hollow body, a flange portion extending outwardly from the lower extremity of and around the periphery of the sidewall of the cover portion, a stabilizing post substantially opposite the hinge in a limited peripheral portion of the sidewall of the cover portion terminating below the flange portion, one of said flange and supporting ledge portions having a skirt extending outwardly away from the outer end thereof, said skirt having locking means formed therein adapted to snap under the other of said flange and supporting ledge portions when the cover portion is closed on the dish portion to hold the cover portion vertically in place on the dish portion, the sidewalls of said cover and dish portions having sections which are angularly related to each other forming corners in the container, said stabilizing post and locking means being peripherally offset from each other in one corner portion thereof, the periphery of the hollow body of the cover portion resting against the supporting ledge of the dish portion and the portion of the stabilizing post below the flange projecting into the chamber of the dish portion when the cover portion is in closed position on the dish portion, the portion of the stabilizing post within the chamber of the dish portion adapted to abut against an upper section of the sidewall of the dish portion on sliding said cover portion on the dish portion in a planar direction away from the hinge to keep the cover portion in substantial vertical alignment with the dish portion.

2. The container of claim 1 wherein the locking means is a pair of outwardly opening U-shaped detents.

* * * * *